G. COLLIS, DEC'D.
F. M. COLLIS, EXECUTRIX.
CHICKEN FEEDING COOP.
APPLICATION FILED NOV. 1, 1913.
1,192,867.
Patented Aug. 1, 1916.
3 SHEETS—SHEET 3.
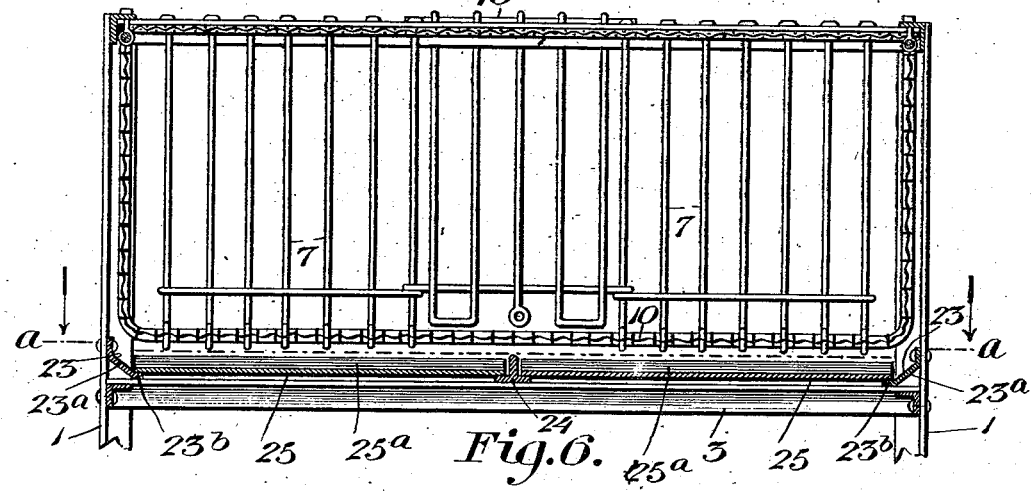
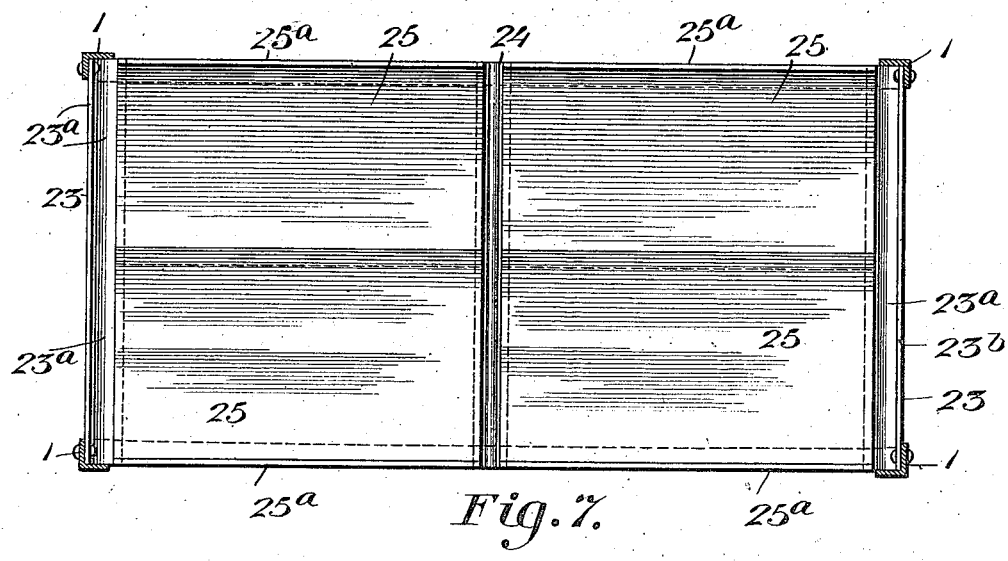
Witnesses
Philip E. Barnes
James Atkins
Inventor
George Collis
By Edmund N. Parry
Attorney

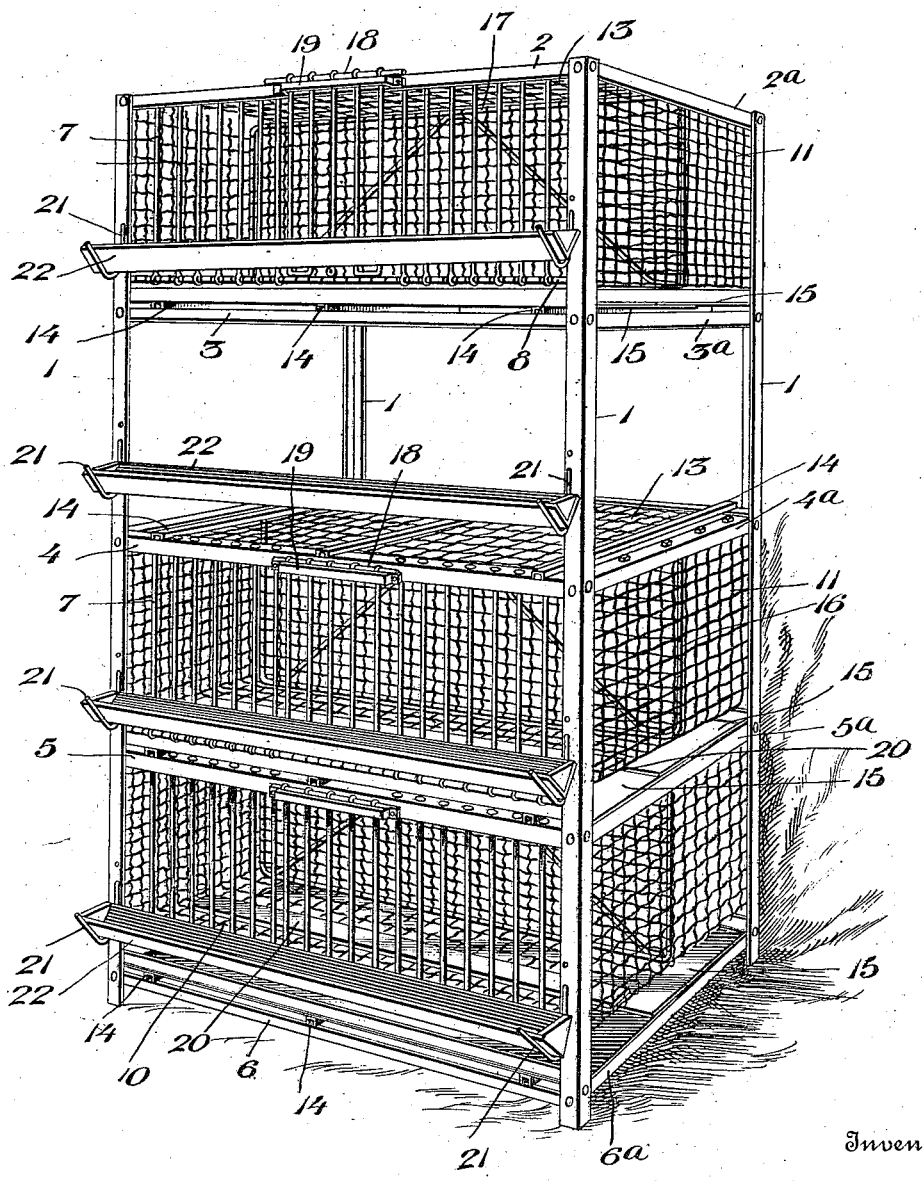

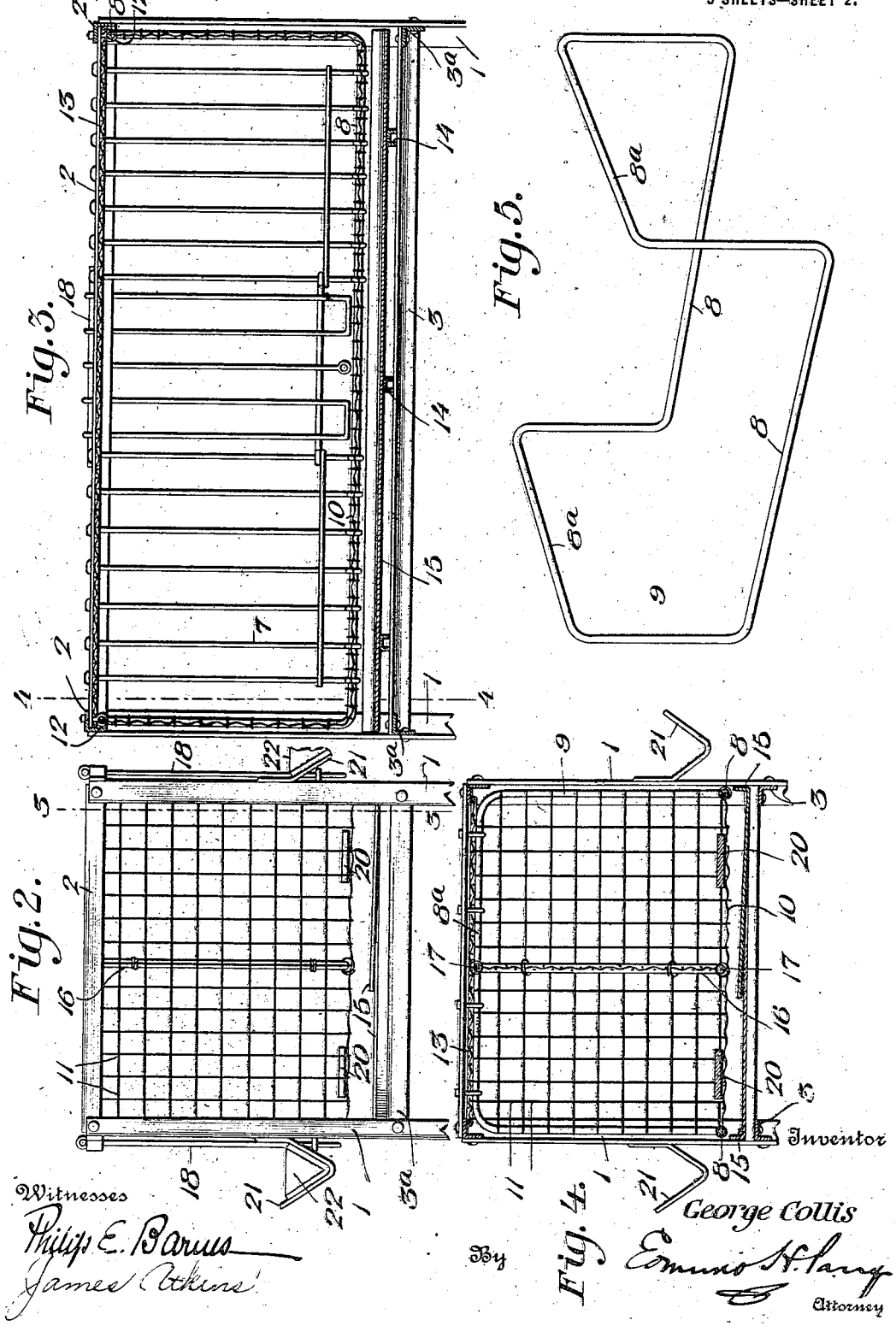

UNITED STATES PATENT OFFICE.

GEORGE COLLIS, OF CLINTON, IOWA; FLORENCE MAY COLLIS, EXECUTRIX OF SAID GEORGE COLLIS, DECEASED, ASSIGNOR TO THE COLLIS COMPANY, OF CLINTON, IOWA, A CORPORATION OF IOWA.

CHICKEN-FEEDING COOP.

1,192,867.      Specification of Letters Patent.      Patented Aug. 1, 1916.

Application filed November 1, 1913. Serial No. 798,750.

*To all whom it may concern:*

Be it known that I, GEORGE COLLIS, a citizen of the United States, residing at Clinton, in the county of Clinton and State of Iowa, have invented certain new and useful Improvements in Chicken-Feeding Coops, of which the following is a specification, reference being had therein to the accompanying drawing.

This invention relates to poultry coops and, particularly, to chicken feeding coops.

At the present time, a large and important industry exists in the production of so-called "milk-fed" chickens. The young fowl, especially, are gathered from various sections and shipped in great numbers to the "feeders", so-called, who place them in coops and feed them on skim-milk, grain, beef-fat, coarse sand, etc. Each feeder has a prescribed but individual course of feeding. It requires from eight to ten days to increase the weight of a fowl approximately twenty-five per cent. When they have attained the desired increase in weight, they are killed, picked, dressed, frozen and shipped to various sections. Each feeder will, during the season, be treating fowl in this manner by the thousands. It is important and essential that the coop shall be kept constantly in the cleanest and most sanitary condition possible, and that the labor of maintaining the coop in this condition shall be reduced to a minimum; otherwise, the industry of "feeding" the fowl would be unprofitable.

It is an object of my invention to provide a coop which shall meet all of these requirements and which shall, at the same time, be simple in construction and comparatively inexpensive to produce.

It is a desideratum of the invention so to dispose the several components of the structure that, for the most part, they occupy positions in spaced relation, whereby they are rendered practically vermin-proof, and the points at which dirt, etc., might collect reduced to a minimum.

To this end, my improved coop resides, in one aspect, in an all-metal structure which includes main sustaining standards or corner-pieces, horizontal cross-bars, and a basket-form suspended from the cross-bars.

In another aspect of the invention, it resides in a metallic structure comprising four angle-iron corner-members, a plurality of horizontally-arranged angle-iron cross-members, a suspended basket-structure attached to the cross-pieces, and a partition dividing the coop into compartments.

In still another aspect, the invention resides in a metallic structure comprising four angle-iron corner-pieces, a plurality of series of horizontally-disposed angle-iron cross-pieces, one series being arranged above another in spaced relation, and a plurality of basket-forms each suspended from a series of said cross-pieces and spaced from each other, and removable droppings-catching elements disposed between each basket-form.

The invention resides broadly in the features of construction, combinations of elements, and arrangements of parts, and in the various aggroupments thereof, all as will be exemplified in the construction hereinafter set forth, and the scope of application of which will be indicated in the appended claims.

In order that the invention may be clearly comprehended by those skilled in the related art, drawings illustrative of one of the many possible utilizations of the same are appended hereto as a part of this disclosure; it being manifest that other possible utilizations and embodiments employing the underlying principles of my invention fall within the spirit thereof and, also, within the objects contemplated thereby.

In the accompanying drawings: Figure 1 is a view in perspective of a chicken-feeding coop constructed in accordance with my invention; Fig. 2 is a fragmentary view in end elevation of the same; Fig. 3 is a view in vertical section on the line 3—3, Fig. 2; Fig. 4 is a view in transverse section on the line 4—4, Fig. 3; Fig. 5 is a detail view in perspective of a basket-supporting frame forming a part of the structure; Fig. 6 is a view similar to Fig. 3, illustrating a modified form of structure; and Fig. 7 is a view in horizontal section, on the line *a*—*a*, Fig. 6, of said modification.

In these drawings, the numeral 1 indicates corner-members which, in this instance, constitute, with other components presently to be mentioned, the general supporting parts of the structure. Preferably and as shown, these corner-members are formed of angle-iron, and there are four of these. Connected with these corner-members are a plurality of sets or series of cross-members or pieces 2—2ª, 3—3ª, 4—4ª, 5—5ª, and 6—6ª, each set or series of which is arranged in spaced relation. The cross-pieces 2—2ª, 3—3ª, 4—4ª, and 5—5ª constitute supporting-instrumentalities for a basket or cage-structure which will presently be described. The corner-members and the cross-pieces constitute a rigid structure formed entirely of metal. The cross-pieces, like the corner-members, are preferably formed of angle-iron, as best seen in Figs. 3 and 4.

Suitably secured in and depending from each of the sets of cross-pieces 2, 3, 4 and 5, at each side of the structure, are vertical wires or strands 7 which at their upper ends project through holes formed in the cross-pieces and are headed, as shown. The lower ends of these strands are connected to the lower elongated portions 8 of a cage-supporting frame 9. Also attached to the portions 8 of said frame is a mesh bottom portion 10. Depending from the portions 8ª of the frame 9 there are mesh or net sections 11 which extend downwardly to the plane of the bottom portion 10 where they are connected with the strands forming said bottom. A top portion 13, formed of mesh wire, is secured to the cross-pieces.

It will thus be seen that the frame 9, the strands 7, the end wires 11, the bottom portion 10, and the top portion 13, constitute a cage-structure. The frame 9 is secured to the cross-pieces by clips 12, so that the cage-structure may properly be said to be sustained by said cross-pieces, and is suspended therefrom and independently of the corner-members 1. As the cross-pieces are arranged in spaced relation, so also are the cage-structures, just described, arranged in spaced relation in respect to each other. In Fig. 1, the second cage-structure from the top is omitted in order that a view may be had of the top of the third cage-structure. Mounted on the cross-pieces 3, 4, 5 and 6 are transverse bars 14, there being three of these, two being disposed in proximity to the corner-members 1, and one being arranged centrally. These transverse pieces constitute supports for two metallic sheets 15, 15, which, at their outside edges, are turned upwardly and, at their inner portions, are overlapped. The two sheets, thus arranged, constitute pans or instrumentalities for catching the droppings of the fowl confined in the overlying cage, and prevent the passing of any such droppings into any of the other cages disposed beneath them.

Suitably secured to portions of the cage-structure, and arranged longitudinally thereof and within the same, is a mesh partition 16 which is formed partly by and receives reinforcement from a frame 17. Each cage is provided with one of these partitions which divides the same into two compartments. Each compartment is provided with a door 18 which is held in position when raised or lowered by a keeper 19. It will thus be seen that access to one of the compartments can be had without interfering with its companion compartment.

Supported by the bottom portions 10 are roosting boards 20, one of which is disposed in each compartment and longitudinally thereof.

Mounted on the outer surfaces of the corner-pieces are brackets 21 and in these are supported troughs 22 which, by reason of the form and arrangement of said brackets, are held in spaced relation with respect to the cage-structure, and also with respect to the roost-boards 20.

In Figs. 6 and 7, I have illustrated a modified form of structure which contemplates—in lieu of the transverse sheet-supporting bars 14—end bracket-elements 23 secured (as by bolts or the like) to the corner-members 1 and an intermediate bracket 24 mounted on the cross-pieces 3. These bracket-elements are preferably and as shown elongated to extend between each of the two end members and are also angulated to provide an inclined portion 23ª and a horizontal sheet-supporting portion 23ᵇ. The bracket 24 has two horizontal portions occupying a plane corresponding to that of the horizontal portions 23ᵇ of the end-brackets. Slidably supported on these horizontal portions, are two pairs of metallic sheets 25, the outer edges of which are bent upwardly to form flanges 25ª and each of the pair preferably overlaps the other. These sheets are pushed in from the sides of the structure and, by reason of the flanges 25ª and the vertical portions of the brackets, each underlying cage is effectually protected from droppings from that just above it.

From the foregoing description, it will be seen that I have provided a structure constructed almost entirely of metal; that the same comprises a plurality of cage-structures which are suspended from the cross-pieces independently of the corner-members and in spaced relation in respect to each other; that, between each of the cage-structures, are interposed instrumentalities for catching the droppings; that the feeding-troughs are also arranged in spaced relation with respect to the cages so that they are not in danger of being defiled; that by reason of the metallic parts and simplicity of arrangement and construction thereof, there is no opportunity for breeding of vermin, as occurs where structures are employed that are made principally of wood; and, finally, as the structure is made of wire, it does not absorb the heat from the fowl, but, on the contrary, permits free passage of air. The cage structures, proper, are made entirely of metal; they are easily removed, one without interfering with another, and the droppings are caught by specially designed instrumentalities which preclude said droppings from getting onto other parts of the structure.

While I have disclosed my invention as particularly applicable to chicken-feeding coops, it is manifest that the invention may be utilized as a coop for storage of fowl, and for other similar purposes.

From the foregoing, it will be perceived that I have succeeded in devising a coop which is well adapted to achieve the several objects and ends in view. The structure is simple and compact in form and it is particularly well fitted for the purposes for which it is designed.

As many changes can be made in the above construction and as many widely different embodiments of the invention can be made without departing from the spirit thereof, it is intended that all matter set forth in the foregoing description and shown in the accompanying drawings shall be interpreted as illustrative and not in any limiting sense. It is also to be understood that the language used in the following claims is intended to cover all of the generic and specific features of the invention which as a matter of language might be said to fall therein.

What I claim is:

1. A coop comprising a plurality of corner members; side and end cross-pieces connecting said members; a cage-structure including a frame having side and end sections and having a woven fabric secured to the frame to constitute top, bottom and end sections of the cage; said frame being secured at its ends to the end cross-pieces; and depending supporting-members connecting the sides of the frame and the side cross-pieces and also forming side sections of the cage-structure.

2. A coop comprising a plurality of corner-members; a series of side and end cross-pieces arranged in spaced relation and connecting said corner-members; a plurality of cage-structures in spaced vertical relation, each including a frame having side and end portions, and a net-structure secured thereto to form top, bottom and end sections of the cage; said frames being secured at their ends to the end cross-pieces of each series; and depending members connecting the sides of the frames of each cage with the side cross-pieces of each series to constitute supporting members and side sections of the cages.

3. A coop comprising a plurality of corner-members; a series of side and end cross-pieces arranged in spaced relation and connecting said corner-members; a plurality of cage-structures in spaced vertical relation, each including a frame having side and end portions, and a net-structure secured thereto to form top, bottom and end sections of the cage; said frames being secured at their ends to the end cross-pieces of each series; and depending members connecting the sides of the frames of each cage with the side cross-pieces of each series to constitute supporting members and side sections of the cages; transverse supporting members connecting the side cross-pieces; and a tray-structure disposed on said supports.

4. A coop comprising a plurality of corner-members; a series of side and end cross-pieces arranged in spaced relation and connecting said corner-members; a plurality of cage-structures in spaced vertical relation, each including a frame having side and end portions, and a net-structure secured thereto to form top, bottom and end sections of the cage; said frames being secured at their ends to the end cross-pieces of each series; depending members connecting the sides of the frames of each cage with the side cross-pieces of each series to constitute supporting members and side sections of the cages; a bracing-instrumentality disposed between the top and bottom of each cage-structure; and a woven fabric secured to said bracing-instrumentality and said sections to form a partition dividing the cages into compartments.

5. A coop comprising a plurality of angulated corner-members; a series of angulated side and end cross-pieces connected together and to said corner-members to form a framework, said side and end cross-pieces being mounted in spaced vertical relation on the corner-pieces, one above another; a plurality of cage-structures disposed in spaced relation and one above another, between the corner-pieces, each cage-structure including a frame having side and end portions and a woven fabric connected thereto to constitute top, bottom and end sections of the cage; the end-portions of the frame being secured to the end cross-pieces of each series; a plurality of depending members connecting the sides of each frame with the side cross-pieces of each series to constitute supporting and side sections of the cages; transverse supports connecting the side-pieces of each series; trays disposed on said supports underneath the cages; a trough for each cage secured in juxtaposition thereto; a bracing frame disposed between the top and bottom sections of each cage; a web secured to said frame and said sections to divide the cage into compartments; a combined bracing-member and roost disposed in each compartment and secured to some of said sections; and doors disposed on the side cross-pieces and communicating with the compartments in the cages.

6. A metallic poultry-feeding coop including in combination, four corner-members, a plurality of sets of horizontally-disposed cross-pieces attached to said corner-members in spaced relation, one above another, a plurality of cage-structures each suspended from a set of the cross-pieces and independently of the corner-members and in spaced relation, said cage-structure comprising a bottom and two end-portions formed of woven strands, vertical side wires depending from the cross-pieces, and a cage-sustaining frame to which said side wires are attached at their lower ends and to which the strands of the end-portions are attached at their upper ends, and a droppings-catching element disposed beneath each cage-structure and in spaced relation to that which overlies it.

In testimony whereof I affix my signature in presence of two witnesses.

GEORGE COLLIS.

Witnesses:
 CHARLES R. PALLOCK,
 FREIDA E. SRITSCHLER.